A. H. DE GASTON & F. McLEAN.
INTERNAL COMBUSTION ENGINE.
APPLICATION FILED JULY 7, 1913.

1,155,709.

Patented Oct. 5, 1915
2 SHEETS—SHEET 1.

WITNESSES:
H. G. Prost.
M. LeConte

INVENTORS
A. H. DE GASTON
AND F. McLEAN
BY Miller &White
their ATTORNEYS

A. H. DE GASTON & F. McLEAN.
INTERNAL COMBUSTION ENGINE.
APPLICATION FILED JULY 7, 1913.

1,155,709.

Patented Oct. 5, 1915.
2 SHEETS—SHEET 2.

WITNESSES:

INVENTORS
A. H. DE GASTON
AND F. McLEAN
BY
their ATTORNEYS.

UNITED STATES PATENT OFFICE.

ALBERT H. DE GASTON AND FREDERIC McLEAN, OF SACRAMENTO, CALIFORNIA, ASSIGNORS TO GLOBE IRON WORKS, OF SACRAMENTO, CALIFORNIA, A CORPORATION OF CALIFORNIA.

INTERNAL-COMBUSTION ENGINE.

1,155,709.     Specification of Letters Patent.     Patented Oct. 5, 1915.

Application filed July 7, 1913. Serial No. 777,614.

*To all whom it may concern:*

Be it known that we, ALBERT H. DE GASTON, a citizen of the United States, and FREDERIC McLEAN, a subject of Great Britain, residents of the city of Sacramento, county of Sacramento, State of California, have invented certain new and useful Improvements in Internal-Combustion Engines, of which the following is a specification.

The invention relates to internal combustion engines and particularly to internal combustion engines adapted to operate on oil fuel.

The object of the invention is to provide a unitary mechanism for feeding the oil fuel and water to the cylinder of the engine.

A further object of the invention is to provide means controlled by the speed of the engine for varying the charge of oil and water.

With these and other objects in view, as will more fully hereinafter appear, the invention consists in certain novel features of construction and arrangement of parts, hereinafter fully described, illustrated in the accompanying drawings and particularly pointed out in the appended claims, it being understood that various changes in the form, proportions, size and minor details of the structures may be made without departing from the spirit of or sacrificing any of the advantages of the invention.

Figure 1:
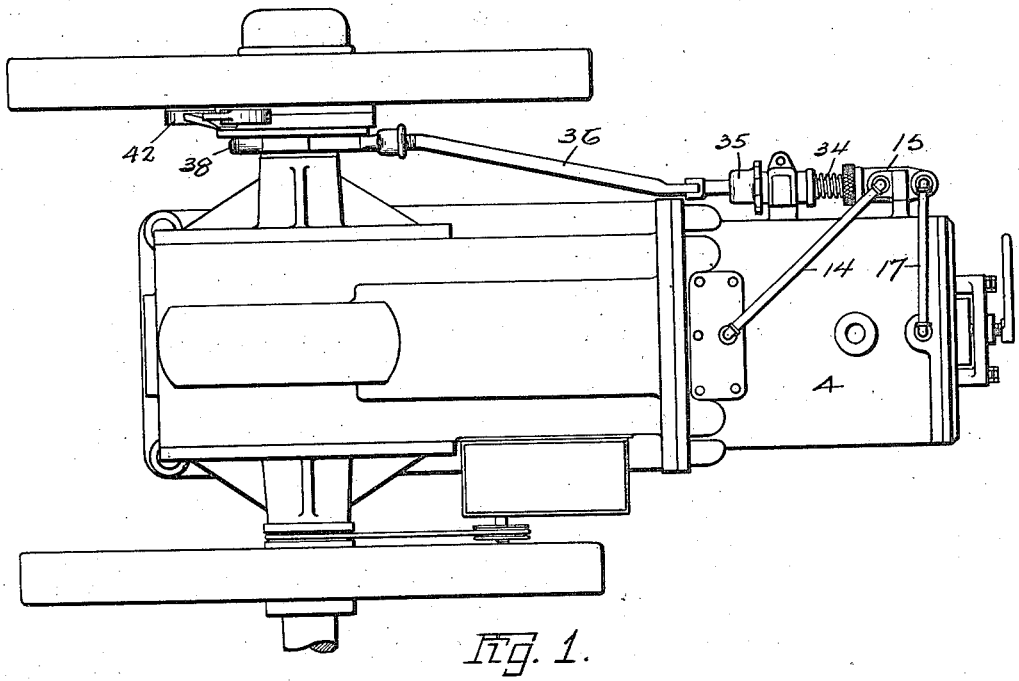
Figure 2:
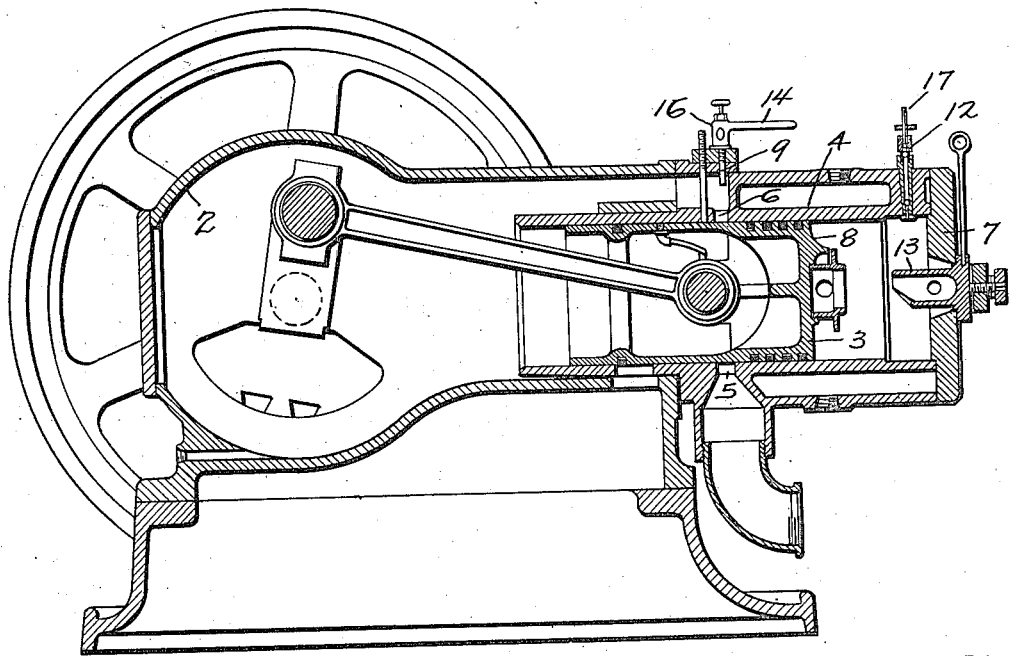
Figure 3:
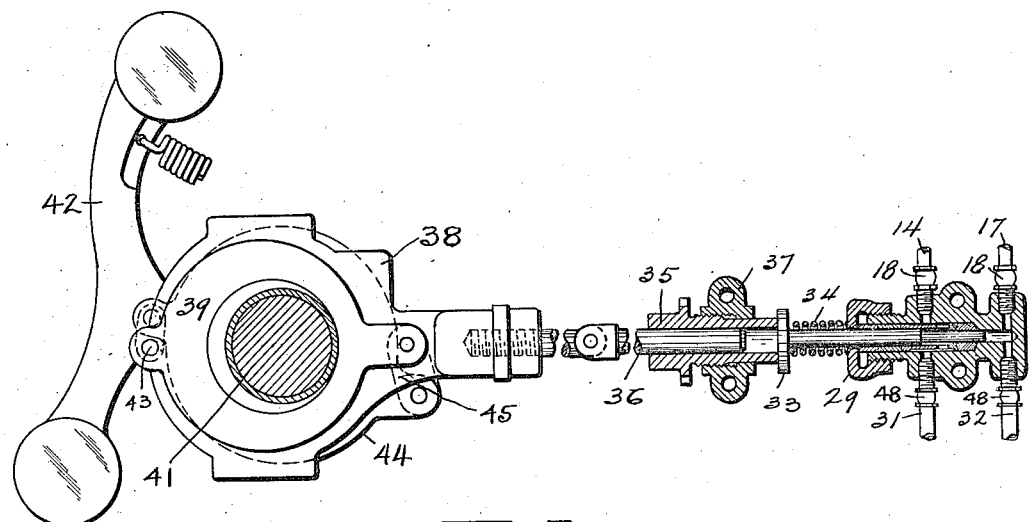
Figure 4:
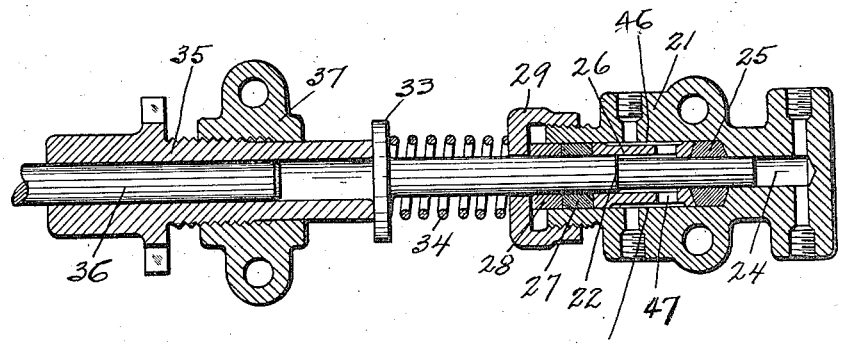

The invention is illustrated in the accompanying drawings, in which,

Figure 1 is a top or plan view of an internal combustion engine provided with the improvements of the present invention. Fig. 2 is a vertical cross section of the engine shown in Fig. 1. Fig. 3 is a detail of the pump and its operating mechanism, the pump being shown in section. Fig. 4 is a cross section, on a larger scale, of the double feed pump.

The engine shown in the accompanying drawings is of the two-cycle type, but it is evident that the invention can be applied to engines of the four cycle type, with equal efficiency.

In operating internal combustion engines using oil fuel, it is advantageous to supply a quantity of water to the cylinder at each cycle in order that sufficient oxygen may be present to unite with all of the carbon in the fuel. According to the present invention, one pump is employed for introducing the charges of both oil and water, the cylinders in the pump barrel being so proportioned that the proper proportion of the two charges is introduced. The pump is operated from the drive shaft of the engine and a governor is employed to vary the stroke of the pump piston with variations in speed of the engine.

In the engine illustrated, compression takes place in the crank case 2 during the forward movement of the piston 3 in the cylinder 4, or on the firing stroke. As the piston reaches the end of its forward stroke, the exhaust port 5 and the inlet port 6 are uncovered, the exhaust port being uncovered in advance of the inlet port. The burnt gases in the cylinder exhaust through the port 5 and compressed air from the crank case enters the cylinder through the port 6 and is deflected toward the head 7 of the cylinder by the deflector 8 on the piston. While the compressed air is passing into the cylinder, a charge of water is delivered from the conductor 9 arranged above the port 6 and is carried into the cylinder. Simultaneously, a charge of fuel is introduced into the cylinder through the fuel injection nozzle 12 and is discharged onto the igniter 13, which is of sufficient temperature to volatilize the charge.

Water is fed to the conductor 9 through the conductor 14 connected to the discharge side of the pump 15, which conductor is preferably provided with a sight feed 16. The oil fuel is conducted to the injection nozzle 12 through the conductor 17 connected to the discharge side of the pump 15. Check valves 18 are preferably provided to prevent the return of the water or oil in the conductors 14 and 17 during the suction stroke of the pump.

The pump 15 comprises a casing 21 which is attached to some stationary part of the engine. The casing is provided with a differential bore in which operates a differential piston 22. The water pumping bore 23 is made considerably larger in diameter than the oil pumping bore 24 to allow for the insertion of an efficient packing ring 25 between the two bores or cylinders. The packing ring 25 is held in place by the bushing 26, arranged in the larger bore 23 of the cylinder. The rear end of the bore 23 is closed by a packing ring 27 abutting against the bushing 26 and being pressed against said bushing and held in place by the packing gland 28 and the gland nut 29. The bushing 26 is provided with a wide circumferential groove 46 which communicates with the water inlet and discharge ports, and the interior of the bushing or the water pumping cylinder communicates with this groove through the apertures 47. Water and oil are conducted to their respective cylinders in the pump through the conductors 31 and 32 extending to a source of supply. These conductors are provided with check valves 48 to prevent the liquid from being forced backward on the pumping stroke.

The differential piston 22 terminates in a head 33, between which and the gland nut 29 is arranged a helical spring 34 which operates to move the piston on the suction stroke. Alined with the piston 22 and adapted to press against the head thereof to operate the pump is a screw 35 which is adjustably clamped to the governor rod 36 by means of the nut 37. By adjusting the piston of the screw on the governor rod 36, the stroke of the pump may be adjusted, thereby permitting one size of pump to be used on various sized engines. The governor rod 36 is connected to the eccentric strap 38 which surrounds the eccentric 39. The eccentric is free to slide in a horizontal direction over the crank shaft 41 and is attached at its forward end to the governor weight 42 by the pin 43. The governor adjusting ring 44 is connected to the rear end of eccentric by means of the link 45. An outward movement of the governor weight decreases the throw of the eccentric 39, consequently decreasing the travel of the governor rod 36 and causing the proper amount of oil and water to be injected into the engine cylinder.

The igniter and the means for holding it in place and the scavenging flange arranged on the piston are described and claimed in co-pending applications, and description thereof in this application is unnecessary.

We claim:

1. The combination with an internal combustion engine adapted to operate on oil fuel, of a double feed pump adapted to feed simultaneous charges of oil and water to the engine cylinder, a double piston in said pump, means connected to the engine adapted to abut against said piston and press it forward on the pumping stroke, means for adjusting the limit of movement of said piston to give a variable normal engine speed, and means for moving the piston on the suction stroke.

2. The combination with an internal combustion engine adapted to operate on oil fuel, of a double feed pump arranged to simultaneously feed charges of oil and water to different parts of the engine cylinder, a double piston in said pump, means connected to the engine and controlled in its movement by variations in the position of the engine by the governor arranged to be reciprocated by the operation of the engine and to abut against said double piston, and means for varying the length of said last named means whereby the normal speed of the engine may be varied.

In testimony whereof, we have hereunto set our hands at Sacramento, California, this 20th day of June, 1913.

ALBERT H. DE GASTON.
FREDERIC McLEAN.

In the presence of—
FRANK F. CADLE,
H. G. PROST.